March 12, 1940.  S. H. JUUL  2,193,029
SAFETY DEVICE FOR AIRCRAFT
Filed Sept. 6, 1938   2 Sheets-Sheet 1

Samuel H. Juul.
INVENTOR
BY Victor J. Evans & Co.
HIS ATTORNEYS

March 12, 1940.    S. H. JUUL    2,193,029
SAFETY DEVICE FOR AIRCRAFT
Filed Sept. 6, 1938    2 Sheets-Sheet 2
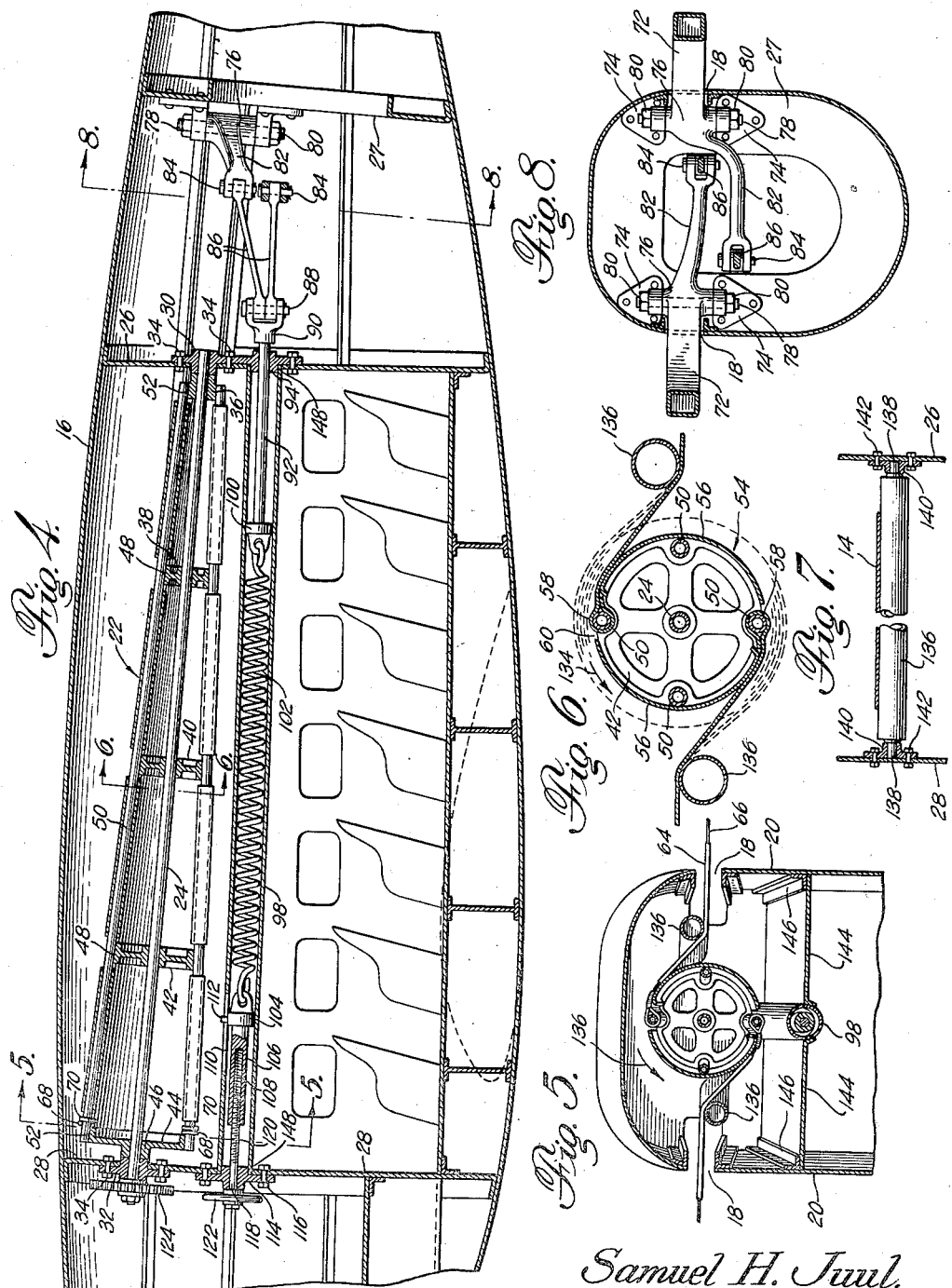
Samuel H. Juul.
INVENTOR
BY Victor J. Evans & Co.
HIS ATTORNEYS Patented Mar. 12, 1940

2,193,029

UNITED STATES PATENT OFFICE 2,193,029

SAFETY DEVICE FOR AIRCRAFT

Samuel H. Juul, Outlook, Mont.

Application September 6, 1938, Serial No. 228,657

4 Claims. (Cl. 244—139)

My invention relates to airplanes and has among its objects and advantages the provision of an improved safety device.

An object of my invention is to provide a safety device designed to facilitate forced landings, as when gliding, wherein the device is so designed as to perform a braking function.

In the accompanying drawings:

Figure 4 is an enlarged sectional view along the line 4—4 of Figure 2;

Figure 5 is a sectional view along the line 5—5 of Figure 4;

Figure 6 is a sectional view along the line 6—6 of Figure 4;

Figure 7 is a sectional view of a roller detail; and

Figure 8 is a sectional view along the line 8—8 of Figure 4.

Figure 1:
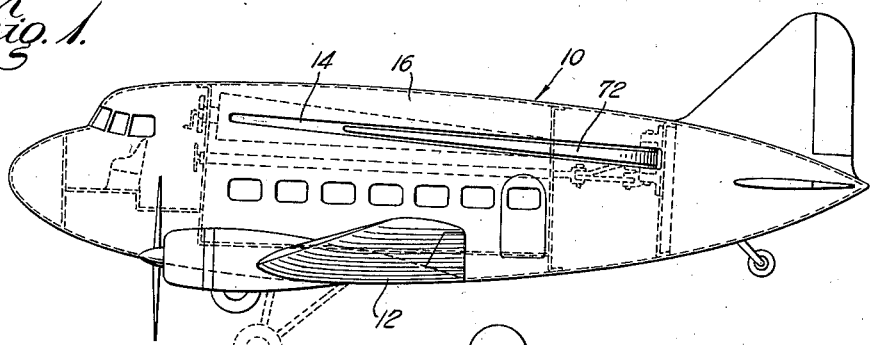
Figure 1 is a side elevational view of an airplane embodying my invention.
Figure 2:
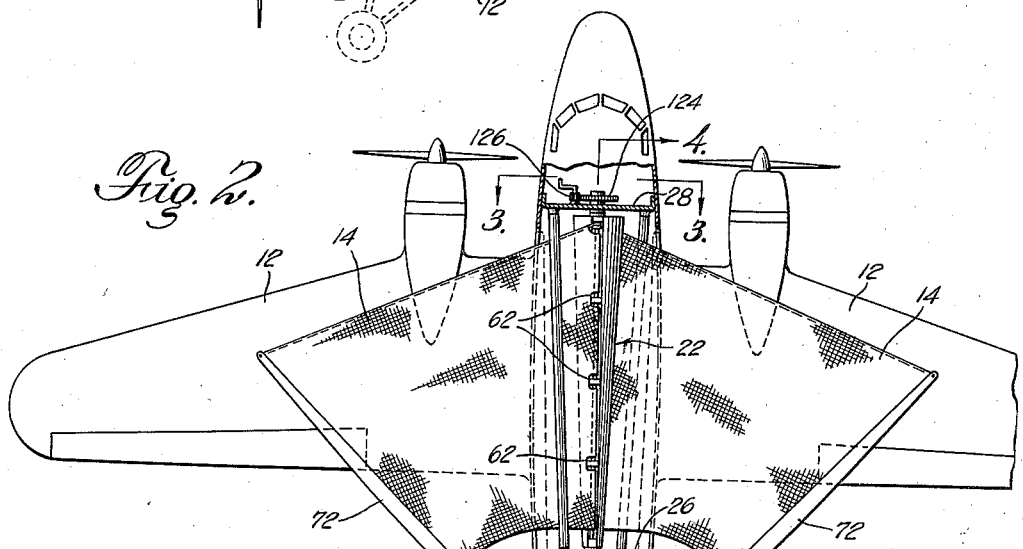
Figure 2 is a top plan view with certain parts removed for the sake of clearness.

In the embodiment selected to illustrate my invention, I make use of an airplane 10 of conventional design and provided with the usual wings 12. Figure 2 illustrates my auxiliary wings 14 in their operating positions. Normally the auxiliary wings 14 are housed within the contour of the fuselage 16. Figures 1 and 5 illustrate the fuselage 16 as being provided with slots 18 in the side walls 20. Auxiliary wings 14 are movable through said slots to their operative and inoperative positions. Specifically, the auxiliary wings 14 comprise flexible material, such as fabric having sufficient strength to withstand the forces effective thereon, and the wings are rolled or wound upon a drum as they are brought inside the fuselage.

This drum is illustrated at 22 and comprises a shaft 24 extending longitudinally of the fuselage. To the walls 26 and 28 I attach bearings 30 and 32, respectively, for rotatably supporting the shaft. The bearings may be made secure by bolts 34. Drum 22 tapers rearwardly of the fuselage and includes an end member 36 keyed to the shaft 24 and arranged in abutting relation with the bearing 30. A plurality of spiders 38, 40 and 42 is keyed to the shaft 24, and the spiders are of progressively increasing diameters in the direction of the forward end of the drum 22. The forward end of the drum includes a spider 44 having a hub 46 keyed to the shaft 24 and arranged in abutting relation with the bearing 32. Spiders 38, 40 and 42 are recessed at 48 for substantially embracing tubes 50 extending longitudinally of the shaft 24, but arranged at angles thereto so as to define the general tapered configuration of the drum. Member 36 and the spider 44 are also recessed, as indicated at 52 for connection with the ends of the tubes 50. The tubes 50 may be made secure by welding in and about the recesses 48 and 52 so as to connect the parts into a unitary structure.

The shell or wall 54 of the drum comprises metal sheets 56 bent to the curvature of the spiders 38, 40 and 42, as well as the member 36 and the spider 44. Sheets 56 are welded to the spiders and the member 36. Wings 14 have their inner edges connected with two of the diametrically opposed tubes 50, as illustrated in Figures 5 and 6. The inner edges of the wings are looped at 58 for connection with the two associated tubes 50, while the sheets 56 are spaced, as at 60, to provide accommodation for the loops 58. The wings 14 are cut away at 62 in alignment with the spiders 38, 40 and 42 so as to permit the loops 58 to be connected with their respective tubes 50. The leading edges of the wings 14 are folded back upon themselves, as at 64, to encircle reinforcing cables 66. One end of each cable is looped about the two tubes 50 associated with the wing loops 58, as at 68, while these tubes are provided with flanges 70 to prevent rearward relative movement of the wings with respect to the two associated tubes 50.

The opposite ends of the cables 66 are fastened to the forward ends of rigid arms 72. Figure 8 illustrates the wall 27 as being provided with two sets of spaced brackets 74 to which the rear ends of the arms 72 are pivotally connected. Each arm includes a bored right-angular bearing 76 for the reception of a bolt 78 attached to the brackets 74 by nuts 80. Each arm 72 includes an angular reach 82 which is pivotally connected at 84 with a link 86. Reaches 82 comprise continuations of the arms 72 so that the arms together with the reaches are in the nature of bell cranks. The reaches 82 are arranged in cross relation, as illustrated in Figures 2 and 8, while the opposite ends of the links 86 are pivotally connected at 88 with the head 90 fixedly related to a shaft 92 slidably supported by a bearing 94 cast as an integral part with the bearing 30 and additionally secured to the wall 26 by bolts 96. Shaft 92 extends into a tube 98 and is provided with a head 100 having close fitting and sliding relation with the tube 98. One end of a tension spring 102 is connected with the head 100, while the opposite end of the spring is connected with a head 104 slidable inside the tube 98 and provided with a shank 106 having a threaded bore 108. I slot the tube 98 at 110 for the reception of a pin 112 fixed to the head 104 to restrain the head from relative rotary motion. Upon the wall 28 I attach a bearing 114 through the medium of bolts 116. Bearing 30 is bored to loosely receive a shaft 118 having a threaded run 120 having threaded relation with the bore 108.

Figure 3:
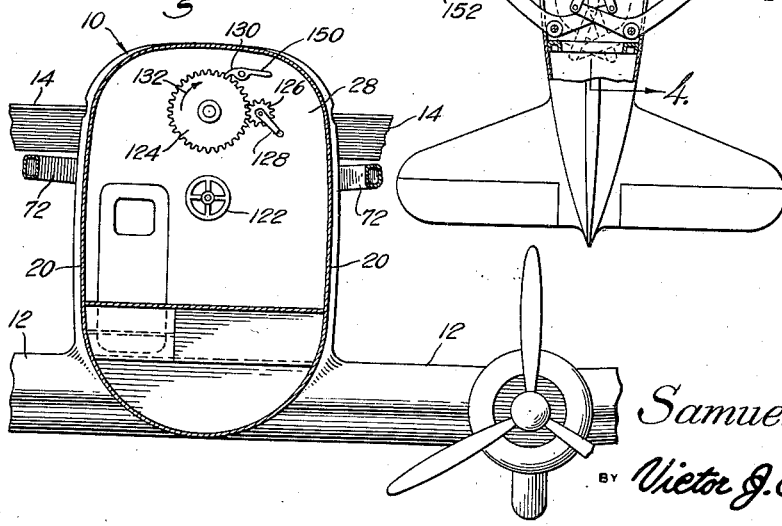
Figure 3 is an enlarged sectional view along the line 3—3 of Figure 2.

To the outer end of the shaft 118 I fixedly connect a hand wheel 122, which wheel bears against the bearing 114 to maintain the spring 102 under tension. The tension of the spring may be varied through rotation of the shaft 118, which rotation shifts the head 104 longitudinally of the tube 98. Spring 102 urges the arms 72 in the direction of their extended positions of Figure 2. The wings 14 may be wound upon the tapered drum 22 through rotation of the drum. Figures 3 and 4 illustrate a gear 124 fixed to the shaft 24, which gear is arranged in mesh with a pinion 126 rotatably mounted on the wall 28 and provided with a crank 128 for manual actuation. I pivot a pawl 130 upon the wall 28 for connection with the gear 124 for latching the gear against rotation in the direction of the arrow 132. The wings 14 are wound upon the drum 22 through rotation of the latter in the direction of the arrows 134 (see Figures 5 and 6). Rotation of the drum 22 for winding up the wings 14 is against the tension of the spring 102, but the pawl 130 will latch the drum against outward pivotal movement of the arms 72, because of effective spring tension thereon, so that the arms may be latched in different positions. Figure 2 illustrates the wings 14 in their fully extended positions.

Referring to Figure 5, the slots 18 lie in a common horizontal plane, while the inner edges of the wings 14 are attached to the drum 22 along diametrically opposite lines of the drum. To bring the extended areas of the wings 14 into a common horizontal plane, I provide idle rolls 136 which extend longitudinally of the drum. One roll bears against the upper face of one of the wings 14, while the other roll bears against the lower face of the other wing, as illustrated in Figures 5 and 6. Figure 7 illustrates one of the idle rolls 136 as being provided with shafts 138 at its ends, which shafts are rotatably journaled in bearings 140 attached to the walls 26 and 28 by bolts 142.

In Figure 5, I illustrate the tube 98 as being welded to plates 144 which in turn are welded to the side walls 20 through the medium of angle irons 146. Plates 144 afford support for the tube throughout its entire length, while the ends of the tube are fitted onto extensions 148 on the bearings 94 and 114 (see Figure 4). Pawl 130 includes a grip 150 through the medium of which the pawl may be manually shifted out of latching relation with the gear 124 to permit rotation thereof.

From the foregoing description of the various parts of the device, the operation thereof will be readily understood. During normal flight, the wings 14 are wound upon the drum 22 with the arms 72 lying in the slots 18. Thus the auxiliary wing structure lies within the contour of the fuselage 16. For emergency landing purposes, the auxiliary wings 14 take the positions of Figure 2. In this position, the wings 14 provide additional wing surface and function to provide a slower gliding speed. The auxiliary wings 14 are characterized by an angle of attack so that the wings will tend to bow upwardly with the concavity underneath the wings. The camber of the auxiliary wings may be varied by changing the tension of the spring 102. In this way the auxiliary wings function somewhat in the nature of a parachute to the end that the gliding speed may be retarded, in addition to providing increased wing area. The auxiliary wings may be employed when landing for braking purposes, while the wings may also be employed in the take-off by partial extension of the wings. Figure 2 illustrates the wings 14 as being cut away to provide air spillways 152 at their rear ends.

I claim:

1. The combination with an airplane having a slotted fuselage, of a drum mounted inside the fuselage, auxiliary wings connected with the drum, means for rotating the drum to wind the auxiliary wings thereon for positioning the same inside the fuselage, and means for drawing the wings through said slots and for supporting the wings in operating positions exteriorly of the fuselage.

2. The combination with an airplane having a slotted fuselage, of a drum mounted inside the fuselage, auxiliary wings connected with the drum, means for rotating the drum to wind the auxiliary wings thereon for positioning the same inside the fuselage, and means for drawing the wings through said slots and for supporting the wings in operating positions exteriorly of the fuselage, said means comprising a tension member and an operating linkage between the tension member and the auxiliary wings.

3. The combination with an airplane having a slotted fuselage, of a drum rotatably mounted inside the fuselage and extending longitudinally thereof, flexible wings connected with the drum to be wound thereon, means for turning the drum, arms connected with the flexible wings, the arms being pivotally connected with a fixed support located in the rear of the rear end of the drum, and resilient means operatively connected with said arms for swinging the same outwardly about their axes to position the flexible wings in operating positions, said flexible wings extending through said slots and said arms normally lying in said slots, with the flexible wings wound upon said drum.

4. The combination with an airplane having a slotted fuselage, of a drum rotatably mounted inside the fuselage and extending longitudinally thereof, flexible wings connected with the drum to be wound thereon, means for turning the drum, arms connected with the flexible wings, the arms being pivotally connected with a fixed support located in the rear of the rear end of the drum, resilient means operatively connected with said arms for swinging the same outwardly about their axes to position the flexible wings in operating positions, said flexible wings extending through said slots and said arms normally lying in said slots, with the flexible wings wound upon said drum, and means for latching the drum against rotation, said resilient means being such as to move said arms and the flexible wings to operating positions when said drum is unlatched.

SAMUEL H. JUUL.